(12) United States Patent
Prasad (10) Patent No.: US 10,815,802 B2
(45) Date of Patent: Oct. 27, 2020

(54) VARIABLE VANE ASSEMBLIES CONFIGURED FOR NON-AXISYMMETRIC ACTUATION

(71) Applicant: UNITED TECHNOLOGIES CORPORATION, Farmington, CT (US)

(72) Inventor: Dilip Prasad, North Granby, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 70 days.

(21) Appl. No.: 16/222,548

(22) Filed: Dec. 17, 2018

(65) Prior Publication Data

US 2020/0191004 A1 Jun. 18, 2020

(51) Int. Cl.
*F01D 9/04* (2006.01)
*F01D 25/04* (2006.01)

(52) U.S. Cl.
CPC ............ *F01D 9/041* (2013.01); *F01D 25/04* (2013.01); *F05D 2220/323* (2013.01); *F05D 2240/12* (2013.01); *F05D 2260/96* (2013.01)

(58) Field of Classification Search
CPC .......... F01D 9/041; F01D 25/04; F01D 5/146; F01D 5/148; F01D 17/16; F01D 17/162; F05D 2220/323; F05D 2240/12; F05D 2260/96
USPC .................................................. 415/160, 161
See application file for complete search history.

(56) References Cited

U.S. PATENT DOCUMENTS

| 3,861,822 | A | 1/1975 | Wanger |
| 5,207,558 | A * | 5/1993 | Hagle ..................... F01D 5/148 415/12 |
| 6,179,559 | B1 * | 1/2001 | Weaver ................... F01D 5/148 415/150 |
| 7,234,914 | B2 * | 6/2007 | Usab, Jr. ................ F01D 5/142 415/1 |
| 7,444,802 | B2 | 11/2008 | Parry |
| 7,549,839 | B2 * | 6/2009 | Carroll .................... F01D 5/148 415/161 |
| 8,297,918 | B2 * | 10/2012 | Bhatnagar ............. F04D 29/563 415/160 |
| 8,641,367 | B2 * | 2/2014 | Norris ................... F01D 17/162 415/115 |
| 8,727,697 | B2 * | 5/2014 | Eifert .................... F01D 17/162 415/1 |
| 9,885,291 | B2 * | 2/2018 | Lecordix .................. F02C 9/22 |
| 10,174,763 | B1 | 1/2019 | Orosa et al. |
| 2003/0161724 | A1 * | 8/2003 | Capozzi ................ F01D 17/162 415/161 |

(Continued)

OTHER PUBLICATIONS

European Patent Office, European Search Report dated Mar. 16, 2020 in Application No. 19217184.1.

*Primary Examiner* — Igor Kershteyn
(74) *Attorney, Agent, or Firm* — Snell & Wilmer L.L.P.

(57) ABSTRACT

A variable vane assembly may comprise a first vane and a second vane. The first vane may comprise a first strut portion and a first flap portion. The first flap portion may be configured to pivot relative to the first strut portion. The second vane may comprise a second strut portion and a second flap portion. The second flap portion may be configured to pivot relative to the second strut portion. The first flap may be configured to pivot independently of the second flap.

13 Claims, 7 Drawing Sheets

(56) References Cited

U.S. PATENT DOCUMENTS

2009/0297334 A1* 12/2009 Norris ..................... F02C 9/22
                                                                 415/49
2010/0166543 A1    7/2010 Carroll
2014/0003909 A1    1/2014 Wassynger et al.
2017/0292400 A1* 10/2017 Bifulco ............... F04D 27/0246

* cited by examiner

VARIABLE VANE ASSEMBLIES CONFIGURED FOR NON-AXISYMMETRIC ACTUATION

FIELD

The present disclosure relates to variable vane assemblies for gas turbine engines, and, more specifically, to variable vane assemblies configured for non-axisymmetric actuation.

BACKGROUND

Gas turbine engines, such as those used to power modern commercial and military aircraft, typically include a fan section, a compressor section, a combustor section, and a turbine section. In general, during operation, air is pressurized in the fan and compressor sections and is mixed with fuel and burned in the combustor section to generate hot combustion gases. The hot combustion gases flow through the turbine section, which extracts energy from the hot combustion gases to power the compressor and fan sections and other gas turbine engine loads. Flow distortions with circumferential nonuniformity at the inlet of the fan section can arise from aircraft maneuvers, cross-winds, inclement weather, and/or steam ingestion aboard aircraft carriers. This circumferential nonuniformity of the inlet flow can have deleterious consequences. For example, it can cause a loss of aerodynamic stability, and/or adverse aeromechanical behavior, driven by large vibratory loads on the rotor blades.

SUMMARY

A variable vane assembly is disclosed herein. In accordance with various embodiments, the variable vane assembly may comprise a first vane and a second vane. The first vane may comprise a first strut portion and a first flap portion. The first flap portion may be configured to pivot relative to the first strut portion. The second vane may comprise a second strut portion and a second flap portion. The second flap portion may be configured to pivot relative to the second strut portion. The first flap portion may be configured to pivot independently of the second flap portion.

In various embodiments, a first actuator may be configured to pivot the first flap portion. A second actuator may be configured to pivot the second flap portion. In various embodiments, the variable vane assembly may further comprise a third vane comprising a third strut portion and a third flap portion. The third flap portion may be configured to pivot relative to the third strut portion. A synchronization bar may be coupled to the first vane and the third vane. In various embodiments, the first actuator may be operably coupled to the synchronization bar.

In various embodiments, the first actuator may comprise an electromechanical actuator, and an axis of rotation of the electromechanical actuator may be concentric to an axis of rotation of the first flap portion. In various embodiments, the first actuator may be located within the first strut portion.

In various embodiments, the first actuator may comprise an electromechanical actuator, and an axis of rotation of the electromechanical actuator may be approximately perpendicular to an axis of rotation of the first flap portion.

A gas turbine engine is also disclosed herein. In accordance with various embodiments, the gas turbine engine may comprise a rotor assembly including a plurality of blades configured to rotate about a central longitudinal axis of the gas turbine engine. A variable vane assembly may be located forward of the rotor assembly. The variable vane assembly may include a first vane comprising a first strut portion and a first flap portion, and a second vane comprising a second strut portion and a second flap portion. The first flap portion may be configured to pivot relative to the first strut portion. The second flap portion may be configured to pivot relative to the second strut portion. The the first flap portion may be configured to pivot independently of the second flap portion.

In various embodiments, the variable vane assembly may be located at an inlet end of a fan section of the gas turbine engine. In various embodiments, the variable vane assembly may further comprise a first actuator configured to pivot the first flap portion, and a second actuator configured to pivot the second flap portion.

In various embodiments, the variable vane assembly may further comprise a third vane comprising a third strut portion and a third flap portion. The third flap portion may be configured to pivot relative to the third strut portion. A synchronization bar may be coupled to the first vane and the third vane.

In various embodiments, the first actuator may comprise an electromechanical actuator, and an axis of rotation of the electromechanical actuator may be concentric to an axis of rotation of the first flap portion. In various embodiments, the first actuator may be located within the first strut portion.

In various embodiments, the first actuator may comprise an electromechanical actuator, and an axis of rotation of the electromechanical actuator may be approximately perpendicular to an axis of rotation of the first flap portion.

A fan section of a gas turbine engine is also disclosed herein. In accordance with various embodiments, the fan section may comprise a fan case and a rotor assembly located radially inward of the fan case. The rotor assembly may include a plurality of blades configured to rotate about a central longitudinal axis of the gas turbine engine. A variable vane assembly may be located forward of the rotor assembly. The variable vane assembly may include a first vane comprising a first strut portion and a first flap portion, and a second vane comprising a second strut portion and a second flap portion. The first flap portion may be configured to pivot relative to the first strut portion. The second flap portion may be configured to pivot relative to the second strut portion. The first flap portion may be configured to pivot independently of the second flap portion.

In various embodiments, the variable vane assembly may further comprise a first actuator configured to pivot the first flap portion, and a second actuator configured to pivot the second flap portion.

In various embodiments, the variable vane assembly may further comprise a third vane comprising a third strut portion and a third flap portion. The third flap portion may be configured to pivot relative to the third strut portion. A synchronization bar may be coupled to the first flap portion and the third flap portion. In various embodiments, the first actuator may be operably coupled to the synchronization bar.

In various embodiments, the first actuator may comprise an electromechanical actuator, and an axis of rotation of the electromechanical actuator may be concentric to an axis of rotation of the first flap portion. In various embodiments, the first actuator may be located within the first strut portion.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

FIG. 1 illustrates a cross-sectional view of an exemplary gas turbine engine, in accordance with various embodiments;

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Surface shading and cross hatching lines may be used throughout the figures to denote different parts but not necessarily to denote the same or different materials. Throughout the present disclosure, like reference numbers denote like elements. Accordingly, elements with like element numbering may be shown in the figures but may not necessarily be repeated herein for the sake of clarity.

As used herein, "aft" refers to the direction associated with the tail (i.e., the back end) of an aircraft, or generally, to the direction of exhaust of a gas turbine engine. As used herein, "forward" refers to the direction associated with a nose (i.e., the front end) of the aircraft, or generally, to the direction of flight or motion.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. The term "axial," as used herein, refers to a direction along or parallel to the engine central longitudinal axis.

Figure 1:
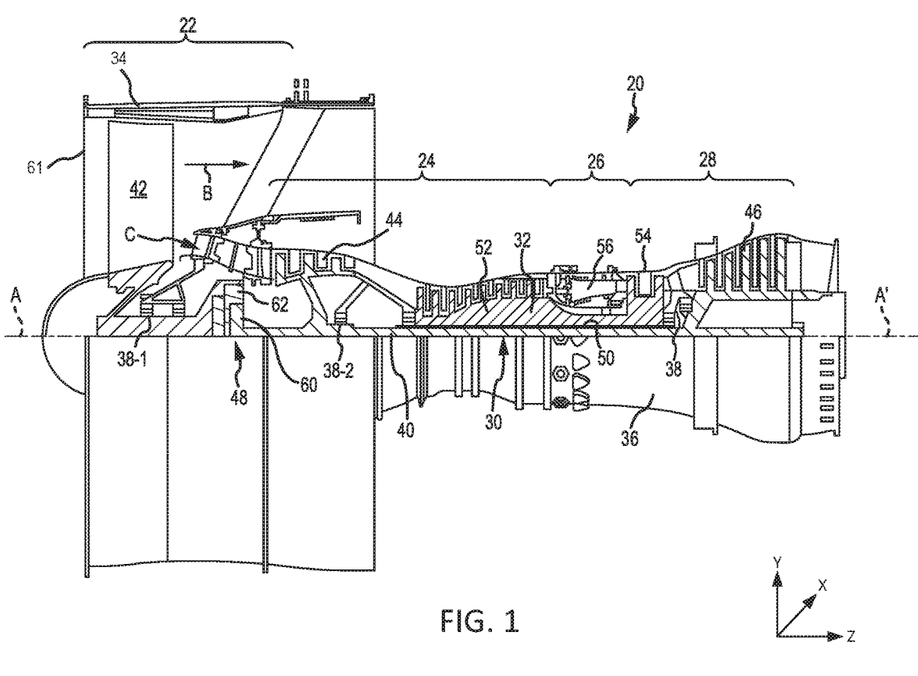

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. In operation, fan section 22 can drive fluid (e.g., air) along a bypass flow-path B while compressor section 24 can drive fluid along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines.

Gas turbine engine 20 may generally comprise a low speed spool 30 and a high speed spool 32 mounted for rotation about an engine central longitudinal axis A-A' relative to an engine static structure 36 or engine case via several bearing systems 38, 38-1, and 38-2. Engine central longitudinal axis A-A' is oriented in the z direction on the provided xyz axis. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure compressor 44 and a low pressure turbine 46. Inner shaft 40 may be connected to fan 42 through a geared architecture 48 that can drive fan 42 at a lower speed than low speed spool 30. A fan case 34 may surround fan 42. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure compressor 52 and high pressure turbine 54.

A combustor 56 may be located between high pressure compressor 52 and high pressure turbine 54. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive respective low speed spool 30 and high speed spool 32 in response to the expansion.

In various embodiments, the low pressure compressor 44, the high pressure compressor 52, the low pressure turbine 46, and the high pressure turbine 54 may comprise one or more stages or sets of rotating blades and one or more stages or sets of vanes axially interspersed with the associated blade stages but non-rotating about engine central longitudinal axis A-A'.

Figure 2A:
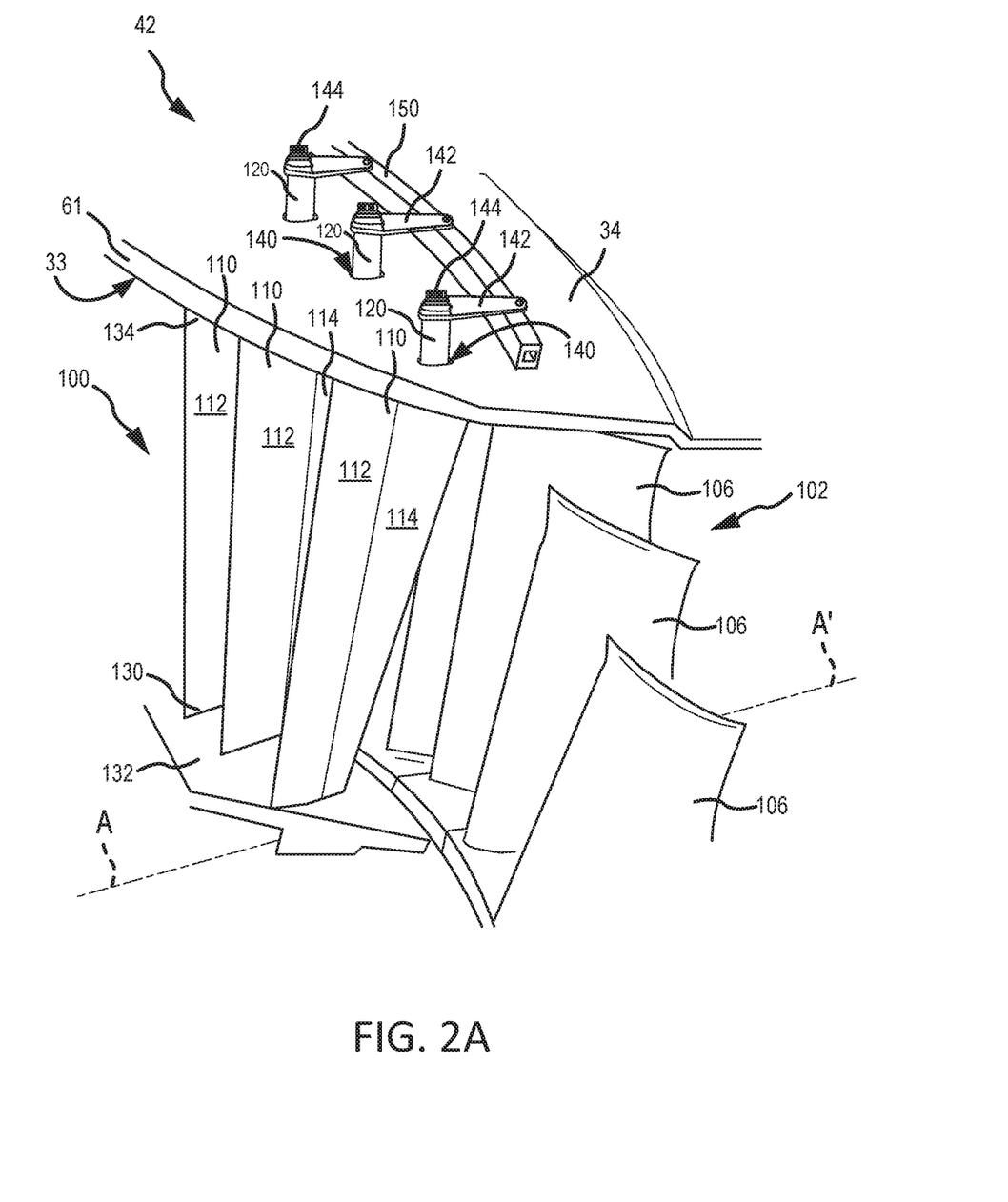
FIG. 2A illustrates a perspective view of a portion of a fan section of a gas turbine engine having a variable vane assembly configured for non-axisymmetric actuation, in accordance with various embodiments.

With reference to FIG. 2A, a forward (or inlet) section of fan 42 is depicted in greater detail. Fan 42 may include one or more rotor assemblies (stages) 102. Rotor assemblies 102 may each comprise a plurality of blades 106 configured to rotate about engine central longitudinal axis A-A'. In various embodiments, a variable vane assembly 100 may be located at forward (or inlet) end 61 of fan case 34. Stated differently, variable vane assembly 100 may be located forward of the forwardmost rotor assembly 102 of fan 42. Variable vane assembly 100 may comprise a plurality of vanes 110 circumferentially spaced about engine central longitudinal axis A-A'. Vanes 110 direct fluid to blades 106. As described in further detail below, vanes 110 may be variable, meaning that a stagger angle of, at least, a portion of vane 110 may be changed to distribute fluid flow evenly about engine central longitudinal axis A-A'.

Figure 3A:
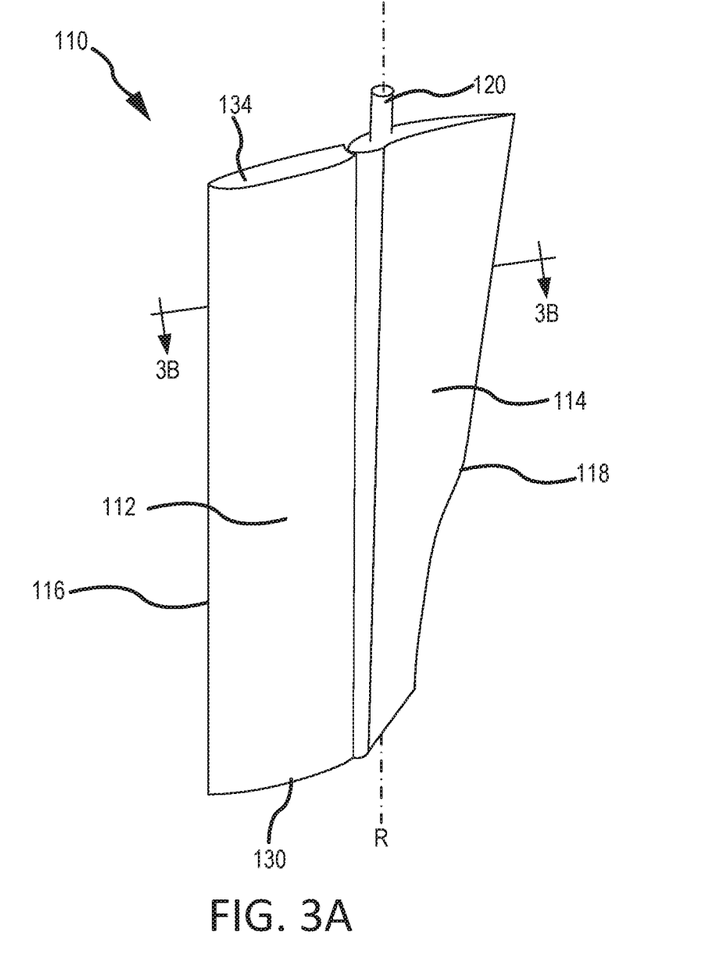
FIG. 3A illustrates a perspective view of a variable vane having a strut section and a flap section, in accordance with various embodiments.
Figure 3B:
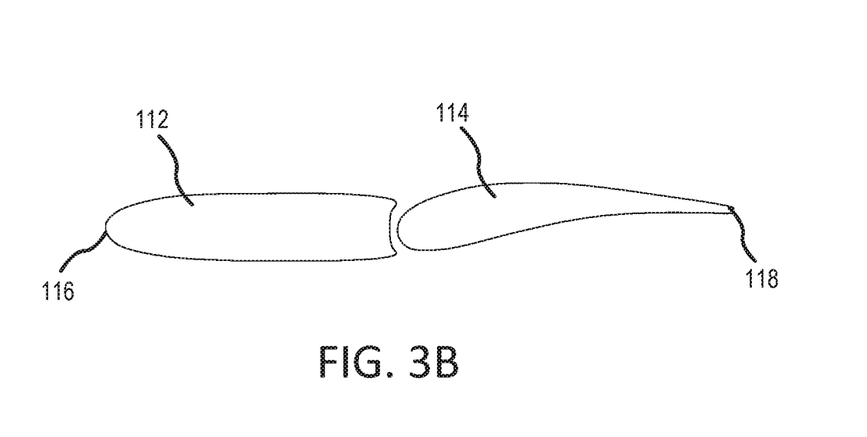
FIG. 3B illustrates a cross-section view the variable vane of FIG. 3A taken along the line 3B-3B in FIG. 3A, in accordance with various embodiments.

FIGS. 3A and 3B illustrate, respectively, a perspective view and cross-section view of a vane 110 are illustrated, in accordance with various embodiments. Vane 110 may include a strut portion 112 and a flap portion 114. Strut portion 112 may form a leading edge 116 of vane 110. Flap portion 114 may form a trailing edge 118 of vane 110. In accordance with various embodiments, flap portion 114 may be configured to pivot relative to strut portion 112. In this regard, flap portion 114 may rotate about a radially extending axis of rotation R-R'. Axis R-R' may be approximately perpendicular to engine central longitudinal axis A-A', with momentary reference to FIG. 1. As used herein, "approximately perpendicular" means±5° from perpendicular. Strut portion 112 is stationary (i.e., does not rotate) relative to axis R-R'. In various embodiments, flap portion 114 may include a vane stem 120 (also referred to as an outer diameter trunnion). Vane stem 120 may extend radially outward from flap portion 114. As described in further detail below, the angle of flap portion 114 relative to strut portion 112 may be changed by rotating vane stem 120 about axis R-R'.

Returning to FIG. 2A, strut portion 112 of vanes 110 may be attached at a radially inward or (or first) end 130 to an inner diameter (ID) shroud 132, and at a radially outward (or second) end 134 to fan case 34. In various embodiments, fan case 34 may define a plurality of vane stem slots 140. Vane stem slots 140 are circumferentially distributed around fan case 34. Vane stems 120 may be located through vane stem slots 140. Vanes stems 120 may protrude radially outward from the vane stem slots 140. In various embodiments, a vane arm 142 may be coupled to each vane stem 120. In various embodiments, a fastener 144 may couple vane arm 142 to vane stem 120. Fastener 144 may comprise a screw, nut and bolt, clip, rivet, or other suitable attachment component. In various embodiments, the vane arm 142 extends approximately perpendicular to the vane stem 120 (e.g., in an axial direction). As used in the previous context, "approximately perpendicular" means±5° from perpendicular.

In accordance with various embodiments, variable vane assembly 100 may be configured for non-axisymmetric actuation. The actuation of vanes 110 may be configured to attenuate circumferential distortion of flow received by the blades 106 such that the flowrate and/or pressure at the forward or leading edge of blades 106 is generally equal about engine central longitudinal axis A-A'. Stated differently, flap portions 114 may be positioned to redistribute the flow exiting variable vane assembly 100 to produce a more uniform flow into rotor assembly 102. Reducing nonuniformity of the incident flow may increase aerodynamic stability and/or decrease vibration of blades 106.

In various embodiments, variable vane assembly 100 may comprise a sector-based actuation scheme, wherein groups of circumferentially adjacent vanes 110 are coupled to one another and actuated in an identical manner, but the actuation authority (i.e., the rotation/translation and positioning) for each vane group may vary. Stated differently, the flap portions 114 in a first vane group may be rotated independently of the flap portions 114 in a second vane group. The number of vane groups and number of vanes 110 per vane group may be chosen based on the primary distortion driver(s) of concern. For example, if it is sought to attenuate the 4E driver because of resonant stress concerns, four groups may be chosen for separate actuation. In various embodiments, the number of vanes 110 per group may be unequal. For example, if variable vane assembly 100 includes seventeen vanes 110, a 4-group actuation scheme may be arranged as 4-4-4-5, with the numbers indicating the number of flap portions 114 in a given group (i.e., three of the vane groups include four flap portions 114 coupled to one another such that the four flap portions 114 may be actuated as a group, and one of the vane groups includes five flap portions 114 coupled to one another such that the five flap portion 114 may be actuated as a group).

In various embodiments, vane groups may be formed by coupling the vanes 110 within a group to a synchronization bar 150. For example, and with reference to FIG. 2B, a first vane group 111a may include the vanes 110 (with momentary reference to FIG. 2A) coupled to a first synchronization bar 150a, a second vane group 111b may include the vanes 110 coupled to a second synchronization bar 150b, and a third vane group 111c may include the vanes 110 coupled to a third synchronization bar 150c. Synchronization bars 150a, 150b, 150c may be mechanically coupled to vane stems 120 (and thus flap portions 114 of each vane 110) via vane arms 142. For example, in various embodiments, a ring fastener 146 may couple each vane arm 142 to its respective synchronization bar 150a, 150b, 150c. Ring fastener 146 may comprise a pin, screw. nut and bolt, clip, rivet or other suitable attachment component.

Figure 2B:
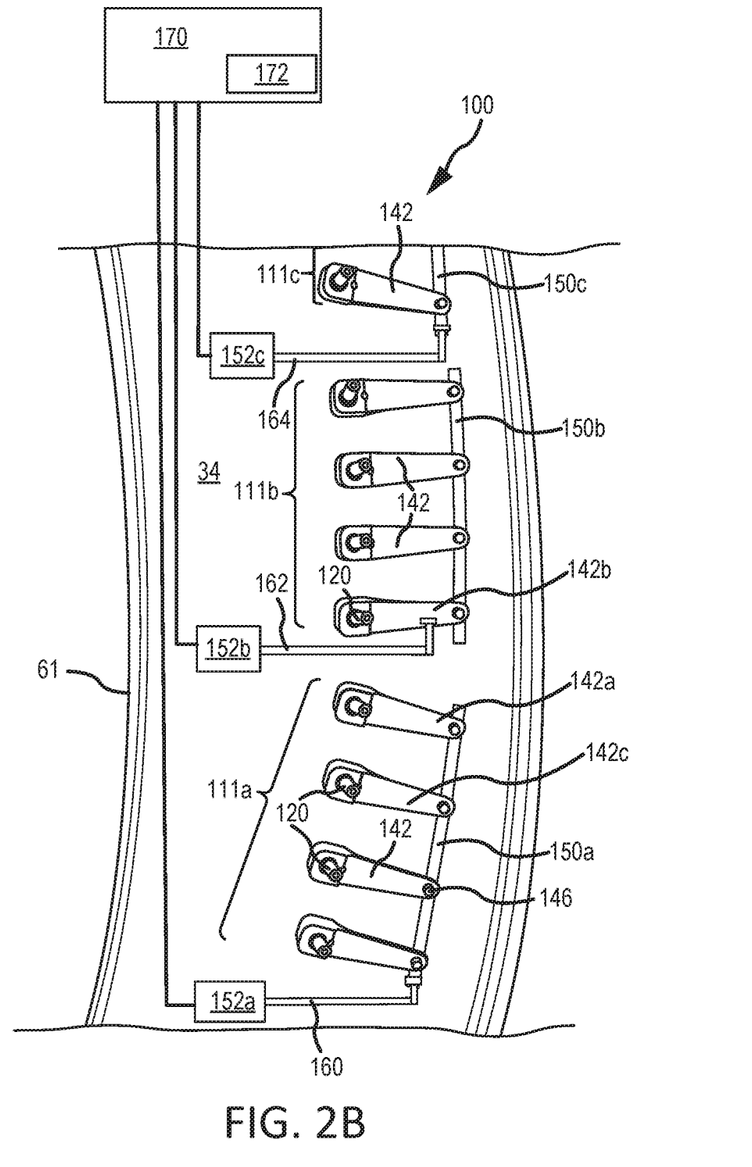
FIG. 2B illustrates a variable vane assembly having vane arms coupled circumferentially in sections and configured for non-axisymmetric actuation, in accordance with various embodiments.

Variable vane assembly 100 includes a plurality of actuators (e.g., first actuator 152a, second actuator 152b, third actuator 152c) with at least one actuator operably coupled to each vane group 111a, 111b, 111c. For example, a first actuator 152a may be operably coupled to and configured to translate first vane group 111a, a second actuator 152b may be operably coupled to and configured to translate second vane group 111b, a third actuator may be coupled to and configured to translate third vane group 111c. Synchronization bars 150a, 150b, 150c are configured to rotate circumferentially relative to fan case 34, in response to actuation of the respective actuator 152a, 152b, 152c. Circumferential rotation of synchronization bar 150a, 150b, and/or 150c causes the angle of the flap portions 114 coupled to the synchronization bar 150a, 150b, 150c to be simultaneously adjusted.

Synchronization bar 150a, 150b, 150c are discrete from one another and may be actuated independently of one another. For example, a first vane arm 142a (and thus a first flap portion 114 of a first vane 110) is coupled to first synchronization bar 150a. A second vane arm 142b (and thus a second flap portion 114 of a second vane 110) is coupled to second synchronization bar 150b. A third vane arm 142c (and thus a third flap portion 114 of a third vane 110) is also coupled to first synchronization bar 150a. Rotation of first synchronization bar 150a will simultaneously rotate first vane arm 142a and third vane arm 142c, but will not rotate second vane arm 142b, thereby allowing the first and third flap portions (i.e., the flap portions 114 coupled to first vane arm 142a and third vane arm 142c) to be rotated and positioned independently of the second flap portion (i.e., the flap portion 114 coupled to second vane arm 142c).

Actuators 152a, 152b, 152c may be coupled to synchronization bar 150a, 150b, 150c and/or to vane arms 142. For example, first actuator 152a is coupled to first synchronization bar 150a via a linkage 160, second actuator 152b is coupled to a vane arm 142 of second vane group 111b via a linkage 162, and third actuator 152c is coupled to third synchronization bar 150c via a linkage 164. Linkages 160, 162, 164 may be configured to translate axial motion generated by actuators 152a, 152b, 152c into circumferential motion of synchronization bars 150a, 150b, 150c.

In various embodiments, actuators 152a, 152b, 152c may each comprise an electromechanical actuator (EMA). In various embodiments, an axis of the rotation of the EMA may be approximately perpendicular to the axis of rotation R-R' of flap portion 114, with momentary reference to FIG. 3A. As used in the previous context, "approximately perpendicular" means±5° from perpendicular. Actuators 152a, 152b, 152c may also comprise hydraulically or pneumatically operated actuators. A controller 170 may be operably coupled to actuators 152a, 152b, 152c. Controller 170 is configured to command actuators 152a, 152b, 152c to rotate to synchronization bars 150a, 150b, 150c to a desired vane group position (i.e., the desired angle of flap portion 114). Controller 170 may determine the desired position of each vane group 111a, 111b, 111c based on an aircraft attitude, an operating condition of gas turbine engine 20, a command from the cockpit (for example a throttle position signal), an altitude measurement, a weather condition, and/or any other suitable operating or flight condition. For example, controller 170 may command actuators 152a, 152b, 152c to actuate synchronization bars 150a, 150b, 150c to one position during a take-off operating condition and to a different position during a cruise operating condition. Controller 170 may position each vane group 111a, 111b, 111c to attenuate circumferential distortion of flow exiting variable vane assembly, such that the flowrate and/or pressure is equally distributed about engine central longitudinal axis A-A', with momentary reference to FIG. 2A.

In various embodiments, controller 170 may comprise a full authority digital engine control (FADEC) system. Controller 170 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof. Controller 170 may include a memory 172. Memory 172 may store executable instructions and data to implement control logic of controller 170. Memory 172 may comprise a non-transitory, tangible computer-readable medium having instructions stored thereon that, in response to execution by the controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 4:
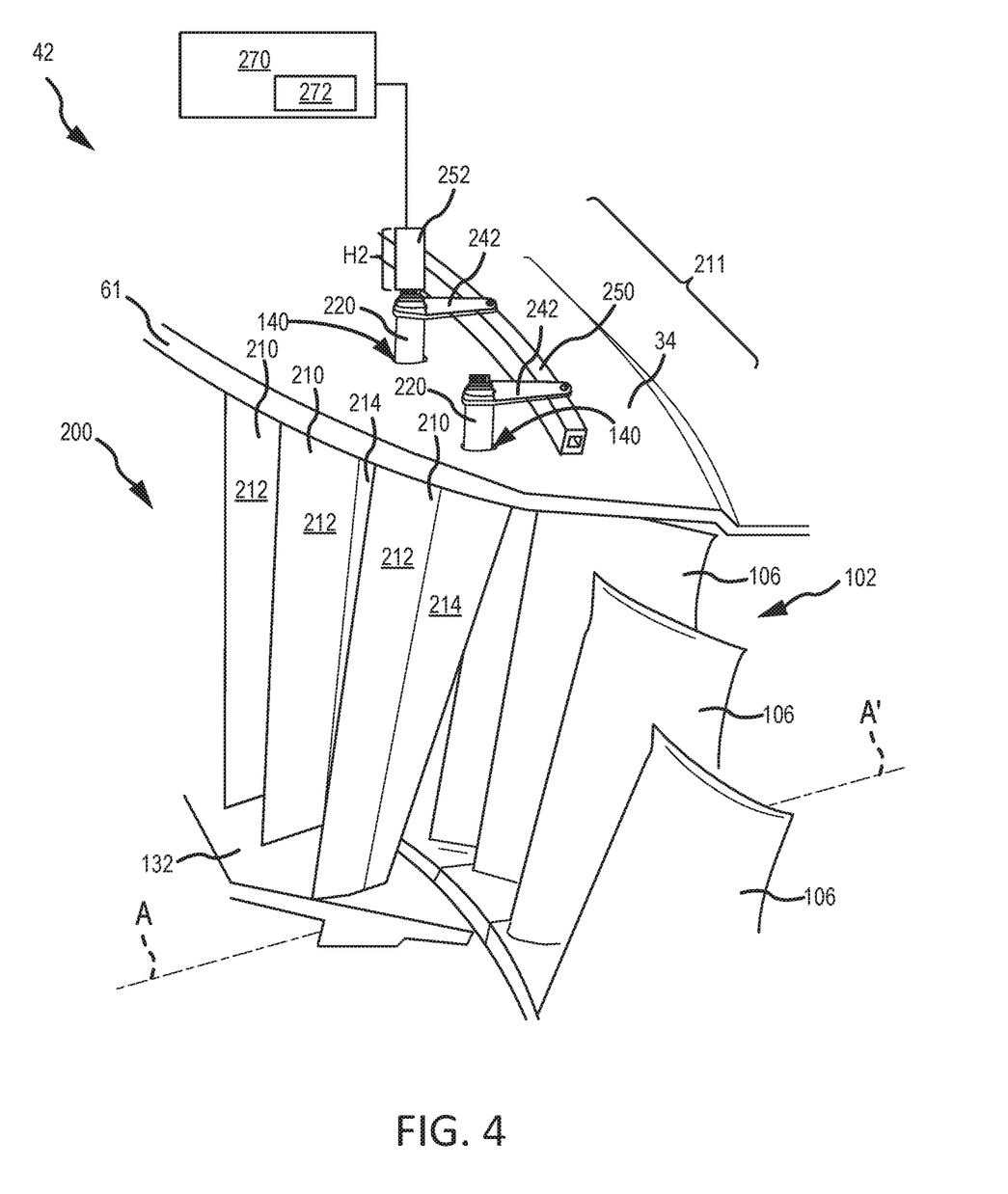
FIG. 4. illustrates a variable vane assembly configured for non-axisymmetric actuation and having vane arms coupled in sections and having an electromechanical actuator (EMA) positioned concentric to the axis of rotation of at least one variable vane within each section, in accordance with various embodiments.

With reference to FIG. 4, a variable vane assembly 200, having one or more concentrically oriented actuators is illustrated, in accordance with various embodiments. Variable vane assembly 200 may be similar to variable vane assembly 100 in FIG. 2A and may replace variable vane assembly 100 in fan 42. Variable vane assembly 200 includes a plurality of vanes 210 having strut portions 212 and flap portions 214 configured to pivot relative to strut portions 212, similar to vanes 110 in FIG. 3A. Variable vane assembly 200 may comprise a sector-based actuation scheme, wherein groups of circumferentially adjacent vanes 210 are coupled to one another via discrete synchronization bars 250 similar to variable vane assembly 100 and synchronization bars 150a, 150b, and 150c in FIG. 2B. In this regard, vanes 210 may be coupled in vane groups 211 such that the vanes 210 within a vane group 211 are actuated in an identical manner, but the actuation authority (i.e., the rotation/translation and positioning) for each vane group 211 may vary.

An actuator 252 may be coupled to a vane stem 220 and/or vane arm 242 of at least one vane 210 within each vane group 211. In various embodiments, actuator 252 comprises an EMA having an axis of rotation that concentric to the axis of the rotation R-R' of flap portion 214, with momentary reference to FIG. 3A. In this regard, actuator 252 may be coupled to vane stem 220 via a geared or splined coupling. Actuator 252 is configured to translate vane stem 220 about axis of the rotation R-R', with momentary reference to FIG. 3A. Rotation of the vane stem 220 coupled to actuator 252 is translated to the other flap portions 114 within the vane group 211 via vane arms 242 and synchronization bar 250.

A controller 270, similar to controller 170 in FIG. 2B, may be operably coupled to actuator 252. In this regard, controller 270 may send command signals to actuator 252 to control a positioning of the flap portions 214 of the vane group 211 actuated by the actuator 252. Controller 270 includes a memory 272, similar to memory 172 in FIG. 2B. Controller 270 may be configured to command non-axisymmetric actuation of the vane groups 211. Controller 270 may determine the desired position of each vane group 211 based on an operating condition of gas turbine engine 20, a command from the cockpit (for example a throttle position signal), a flight condition, or any other suitable operating or flight condition. Controller 270 may position each vane group 211 to attenuate circumferential distortion of flow exiting variable vane assembly, such that the flowrate and/or pressure is equally distributed about engine central longitudinal axis A-A'.

Figure 5:
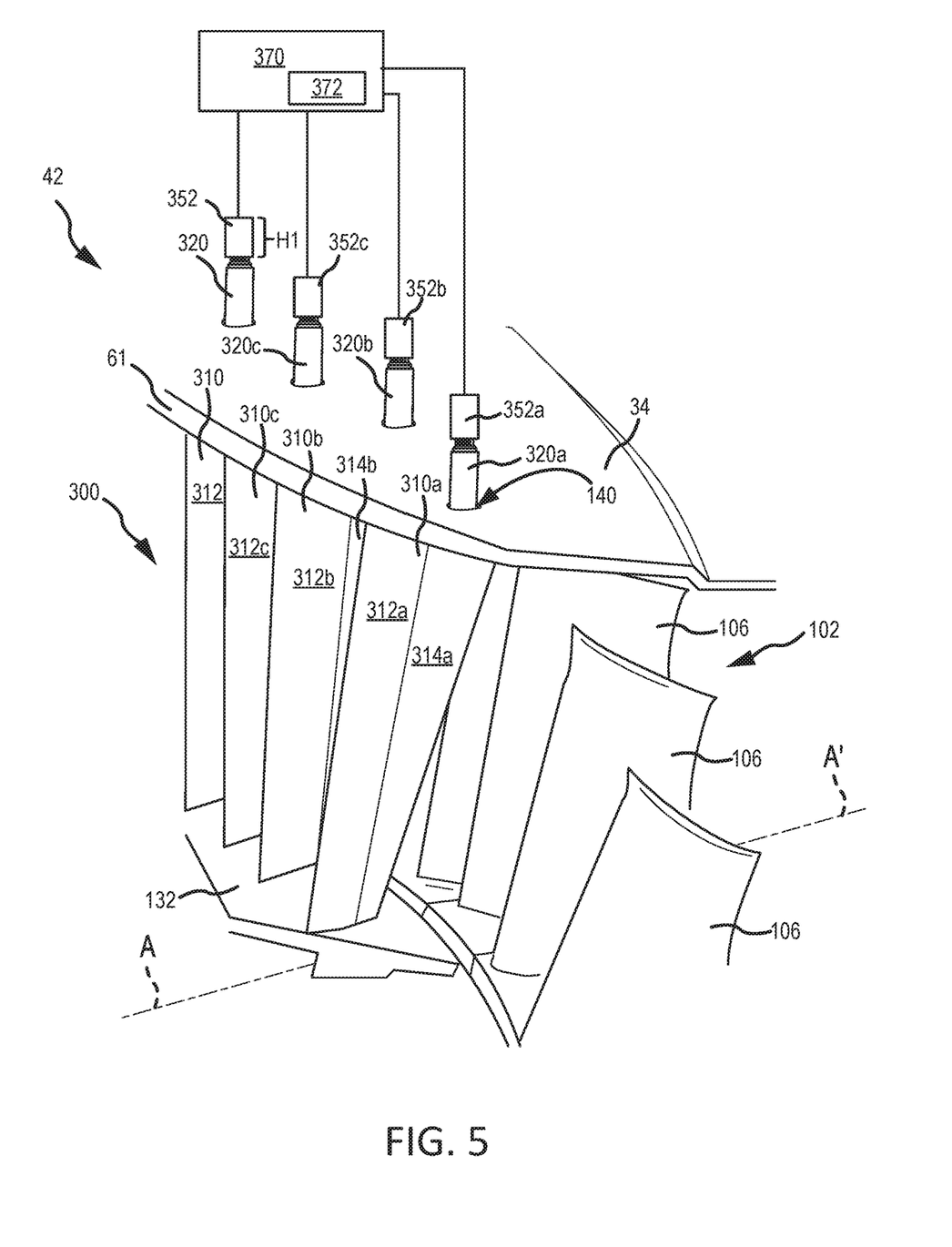
FIG. 5. illustrates a variable vane assembly configured for non-axisymmetric actuation and with each variable vane comprising a dedicated EMA positioned concentric to the axis of rotation of the variable vane, in accordance with various embodiments.

With reference to FIG. 5, a variable vane assembly 300 having an actuator dedicated to each vane flap is illustrated, in accordance with various embodiments. Variable vane assembly 300 may include components similar to variable vane assembly 100 in FIG. 2A and may replace variable vane assembly 100 in fan 42. Variable vane assembly 300 includes a plurality of vanes 310 having stationary strut portions 312 and pivotable flap portions 314, similar to vanes 110 in FIG. 3A. Variable vane assembly 300 may comprise an individual-vane-based actuation scheme, wherein each vane 310 is operably coupled to an actuator 352 such that the actuation authority (i.e., the rotation/ translation and positioning) for each vane 310 may be varied. Stated differently, each flap portion 314 may rotate independently of each of the other flap portions 314.

Actuators 352 may be coupled to rotationally coupled to the flap portion 214 of each vane 310. For example, a first actuator 352a may be coupled to a stem 320a of first vane 310a, a second actuator 352b may be coupled to a vane stem 320b of a second vane 310b circumferentially adjacent to the first vane 310a, a third actuator 352c may be coupled to a vane stem 320c of a third vane 310c circumferentially adjacent to the second vane 310b, and so on. Actuators 352 is configured to translate vane stem 320 about axis of the rotation R-R', with momentary reference to FIG. 3A. In various embodiments, actuators 352 comprise EMAs configured such that an axis of rotation of the EMA is concentric to the axis of the rotation R-R' of flap portions 314, with momentary reference to FIG. 3A. In this regard, actuators 352 may be coupled to vane stem 220 via a geared or splined coupling. A size of actuators 352 may be reduced as compared to actuators 152 in FIG. 2B and actuators 252 in FIG. 4, as the torque associated with rotation of a single flap portion 314 is less than the torque associated with rotation each of the flap portions (e.g., flap portions 114a/214) within a vane group (e.g., 111a/211). For example, a radial height H1 of actuators 352 may be less than a radial height H2 of actuator 252 in FIG. 4. Radial height H1 of actuators 352 may also be less than a radial height of actuator 152 in FIG. 2B, A controller 370, similar to controller 170 in FIG. 2B, may be operably coupled to actuators 352. In this regard, controller 370 may send command signals to actuators 352 to control a positioning of each flap portion 314. Controller 370 includes a memory 372, similar to memory 172 in FIG. 2B. Controller 370 may be configured to command non-axisymmetric actuation of vanes 310. Controller 370 may be configured to determine the desired position of each flap portion 314 based on an aircraft attitude, an operating condition of gas turbine engine 20, a command from the cockpit (for example, a throttle position signal), an altitude measurement, a weather condition, and/or any other suitable operating or flight condition. Controller 370 may position each vane 310 (i.e., each flap portion 314) to attenuate circumferential distortion of flow exiting variable vane assembly, such that the flowrate and/or pressure is equally distributed to rotor assembly 102 about engine central longitudinal axis A-A'.

Figure 6:
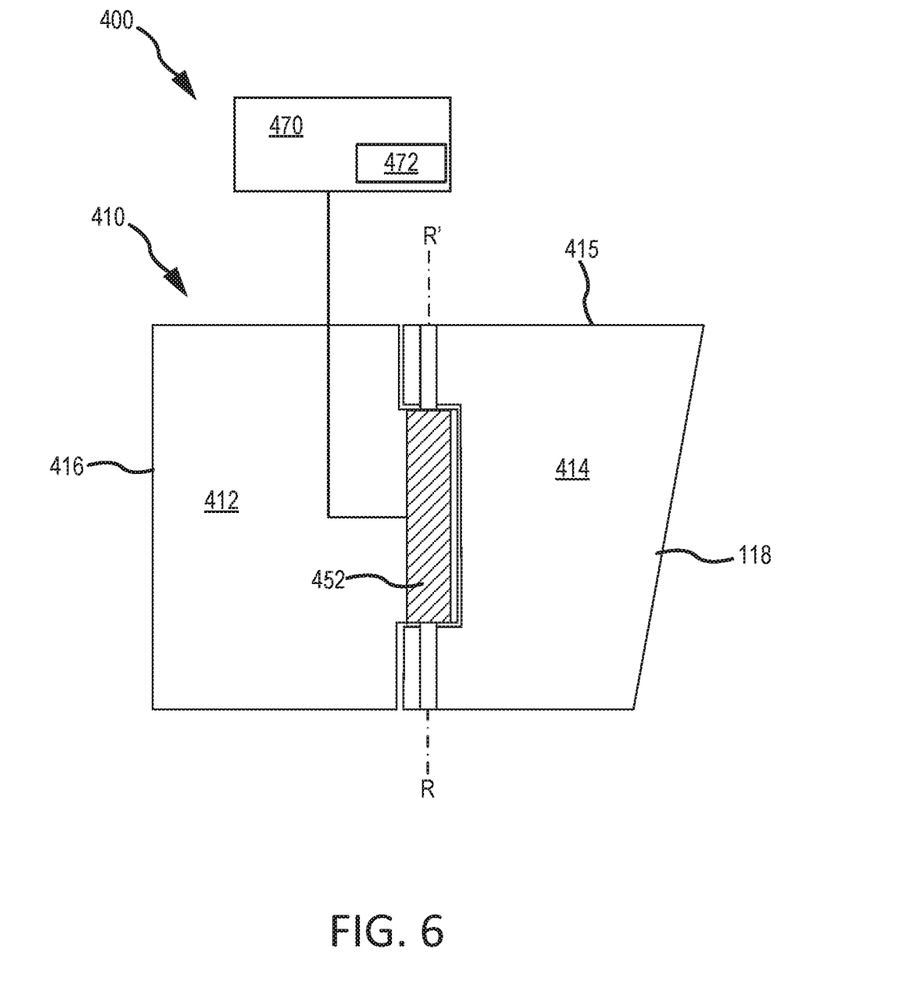
FIG. 6. illustrates a schematic of a variable vane assembly configured for non-axisymmetric actuation and having an EMA positioned within the strut portion of a variable vane, in accordance with various embodiments.

With reference to FIG. 6, a vane 410 of a variable vane assembly 400 is illustrated, in accordance with various embodiments. Variable vane assembly 400 may include components similar to variable vane assembly 100 in FIG. 2A and may replace variable vane assembly 100 in fan 42. Variable vane assembly 400 includes a plurality of vanes 410. Vanes 410 each include a strut portion 412 and a flap portion 414. Strut portion 412 may form a leading edge 416 of vane 410. Flap portion 414 may form a trailing edge 418 of vane 410. In accordance with various embodiments, flap portion 414 may be configured to pivot relative to strut portion 412. In this regard, flap portion 414 may rotate about radially extending axis of rotation R-R'. Strut portion 412 is stationary (i.e., does not rotate) relative to axis R-R'. In various embodiments, flap portion 414 may not include a vane stem. In this regard, a radially outward surface 415 of flap portion may be flush with, or generally follow a contour of, the radially inward surface 33 of fan case 34, with momentary reference to FIG. 2A. The angle of flap portion 414 relative to strut portion 412 may be changed by rotating flap portion 414 about axis R-R'.

Variable vane assembly 400 may comprise an individual-vane-based actuation scheme, wherein each vane 410 is operably coupled to an actuator 452 such that the actuation authority (i.e., the rotation/translation and positioning) for each vane 410 may be varied. Stated differently, each flap portion 414 may rotate independently of each of the other flap portions 414 within variable vane assembly 400.

In accordance with various embodiments, actuator 452 may be located within strut portion 412 and rotationally coupled to the flap portion 414. Stated differently, actuator 452 may be located within a cavity defined, at least partially, by strut portion 412. Actuators 452 is configured to translate flap portion 414 about axis of the rotation R-R'. In various embodiments, actuators 452 comprise EMAs configured such that an axis of rotation of the EMA is concentric to the axis of the rotation R-R' of flap portions 414. In this regard, actuator 452 may be coupled to flap portion 414 via a geared or splined coupling.

A controller 470, similar to controller 170 in FIG. 2B, may be operably coupled to actuators 452. In this regard, controller 470 may send command signals to actuators 452 to control a positioning of each flap portion 414. Controller 470 includes a memory 472, similar to memory 172 in FIG. 2B. Controller 470 may be configured to command non-axisymmetric actuation of vanes 410. Controller 470 may be configured to determine the desired position of each flap portion 414 based on an aircraft attitude, an operating condition of gas turbine engine 20, a command from the cockpit (for example a throttle position signal), an altitude measurement, a weather condition, and/or any other suitable operating or flight condition. Controller 470 may position each vane 410 (i.e., each flap portion 414) to attenuate circumferential distortion of flow exiting variable vane assembly 400, such that the flowrate and/or pressure is equally distributed about engine central longitudinal axis A-A'.

While variable vane assemblies 100, 200, 300, and 400 are described with reference to inlet end 61 of fan 42 of gas turbine engine 20, it is further contemplated and understood that the variable vane assemblies disclosed herein may be employed in other sections of gas turbine engine 20, for example, in other areas of fan section 22 and/or in compressor section 24 and/or in turbine section 28.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A variable vane assembly, comprising:
   a first vane comprising a first strut portion and a first flap portion, wherein the first flap portion is configured to pivot relative to the first strut portion;
   a second vane comprising a second strut portion and a second flap portion, wherein the second flap portion is configured to pivot relative to the second strut portion, and wherein the first flap portion is configured to pivot independently of the second flap portion;
   a first electromechanical actuator configured to pivot the first flap portion, wherein an axis of rotation the first electromechanical actuator is concentric to an axis of rotation of the first flap portion; and
   a second electromechanical actuator configured to pivot the second flap portion.

2. The variable vane assembly of claim 1, further comprising:
   a third vane comprising a third strut portion and a third flap portion, wherein the third flap portion is configured to pivot relative to the third strut portion; and
   a synchronization bar coupled to the first vane and the third vane.

3. The variable vane assembly of claim 1, wherein the first electromechanical actuator is located within the first strut portion.

4. A gas turbine engine, comprising:
   a rotor assembly including a plurality of blades configured to rotate about a central longitudinal axis of the gas turbine engine; and
   a variable vane assembly located forward of the rotor assembly, the variable vane assembly including:
   a first vane comprising a first strut portion and a first flap portion, wherein the first flap portion is configured to pivot relative to the first strut portion;
   a second vane comprising a second strut portion and a second flap portion, wherein the second flap portion is configured to pivot relative to the second strut portion, and wherein the first flap portion is configured to pivot independently of the second flap portion;
   a first actuator configured to pivot the first flap portion, wherein the first actuator is located within the first strut portion; and
   a second actuator configured to pivot the second flap portion.

5. The gas turbine engine of claim 4, wherein the variable vane assembly is located at an inlet end of a fan section of the gas turbine engine.

6. The gas turbine engine of claim 4, wherein the variable vane assembly further comprises:
   a third vane comprising a third strut portion and a third flap portion, wherein the third flap portion is configured to pivot relative to the third strut portion; and
   a synchronization bar coupled to the first vane and the third vane.

7. The gas turbine engine of claim 4, wherein the first actuator comprises an electromechanical actuator, and wherein an axis of rotation of the electromechanical actuator is concentric to an axis of rotation of the first flap portion.

8. The gas turbine engine of claim 4, wherein the first actuator comprises an electromechanical actuator.

9. A fan section of a gas turbine engine, comprising:
   a fan case;
   a rotor assembly located radially inward of the fan case, the rotor assembly including a plurality of blades configured to rotate about a central longitudinal axis of the gas turbine engine; and
   a variable vane assembly located forward of the rotor assembly, the variable vane assembly including:
   a first vane comprising a first strut portion and a first flap portion, wherein the first flap portion is configured to pivot relative to the first strut portion;
   a second vane comprising a second strut portion and a second flap portion, wherein the second flap portion is configured to pivot relative to the second strut portion, and wherein the first flap portion is configured to pivot independently of the second flap portion;
   a first actuator configured to pivot the first flap portion, wherein an axis of rotation of the first actuator is concentric with an axis of rotation of the first flap portion; and
   a second actuator configured to pivot the second flap portion.

10. The fan section of claim 9, wherein the variable vane assembly further comprises:
    a third vane comprising a third strut portion and a third flap portion, wherein the third flap portion is configured to pivot relative to the third strut portion; and
    a synchronization bar coupled to the first flap portion and the third flap portion.

11. The fan section of claim 10, further comprising a vane arm coupled between the first vane and the synchronization bar, wherein the first actuator is operably coupled to the synchronization bar via the vane arm.

12. The fan section of claim 9, wherein the first actuator comprises an electromechanical actuator.

13. The fan section of claim 9, wherein the first actuator is located within the first strut portion.

* * * * *